Patented Oct. 5, 1954

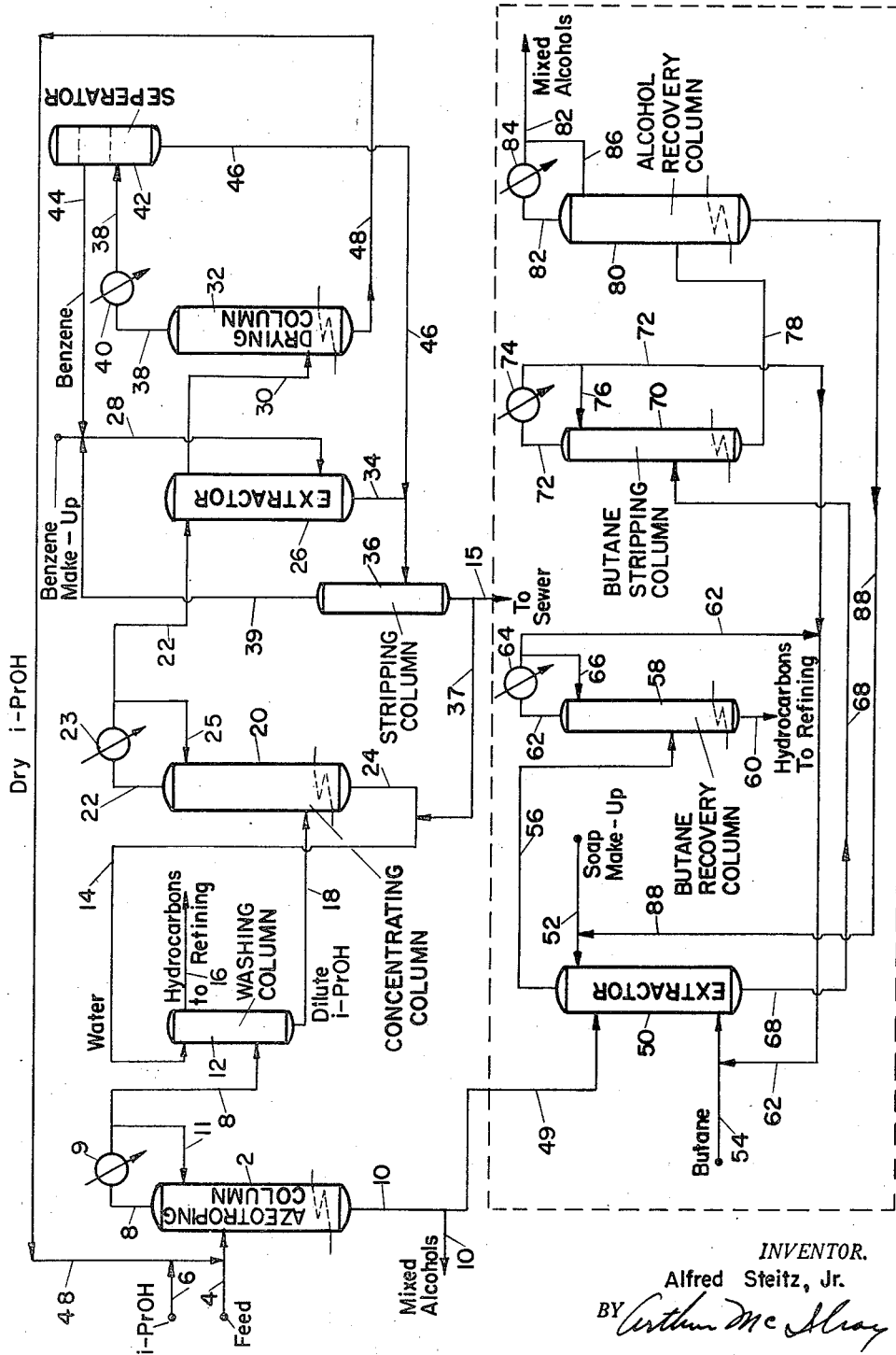

2,690,995

UNITED STATES PATENT OFFICE 2,690,995

PROCESS OF RECOVERY OF OIL SOLUBLE ALCOHOLS BY AZEOTROPIC DISTILLATION WITH ISOPROPYL ALCOHOL

Alfred Steitz, Jr., Tulsa, Okla., assignor to Stanolind Oil and Gas Company, Tulsa, Okla., a corporation of Delaware Application August 25, 1950, Serial No. 181,494

4 Claims. (Cl. 202—42)

The present invention relates to the purification of alcohols. More particularly, it is concerned with the recovery of oil soluble alcohols in purified form from hydrocarbon-containing solutions thereof.

While the process of my invention pertains generally to the removal of hydrocarbons from oil soluble alcohols, it is particularly applicable to the recovery of alcohols found in a neutralized oil stream produced by the hydrogenation of carbon monoxide in the presence of a fluidized alkali-promoted iron catalyst under known synthesis conditions. The oil product stream obtained in hydrocarbon synthesis contains a rather wide variety of ketones, aldehydes and alcohols, together with a very substantial proportion of acids, which are generally removed from the oil in a neutralization step. For example, in hydrocarbon synthesis plants designed to produce in the neighborhood of 6,000 barrels of liquid hydrocarbons per day there are also produced along with the oil fraction approximately 76,000 pounds of carbonyl compounds (aldehydes and ketones), 61,700 pounds of oil soluble alcohols and 69,300 pounds of oil soluble acids per day. Because of their value as chemicals it is desirable to recover these compounds from the oil stream as completely as possible, either as such or in the form of useful derivatives thereof. Also, in the subsequent conversion of the aforesaid oil fraction into gasoline it is imperative that such compounds either be removed from the oil or converted into substances such as, for example, unsaturated hydrocarbons which can then be utilized in conjunction with the hydrocarbons originally synthesized to make high quality motor fuel.

Because of the close proximity in boiling points of these various oil soluble chemicals to the hydrocarbons constituting the oil fraction, separation of chemicals from hydrocarbons by normal fractional distillation methods is a practical impossibility. Normally, in the recovery of chemicals from the oil stream, the raw primary synthesis oil, as it comes from the separating unit, is treated with sufficient caustic to neutralize the acids present. There result two layers, a neutral oil layer containing the bulk of the non-acid oil soluble chemicals and a lower aqueous layer containing the acids in the form of their corresponding salts together with an appreciable percentage, i. e., approximately 10 to 15 weight per cent of non-acid chemicals which have been solubilized thereby and from about 5 to 8 weight per cent of hydrocarbons, depending, of course, on the strength of the caustic initially added. While recovery of the acids from the aforesaid aqueous layer can be accomplished without substantial difficulty, the solubilized chemicals and hydrocarbons present a rather formidable problem, especially where it is desired to effect a substantially complete separation of chemicals from hydrocarbons. Further extraction of the neutral oil layer with soap solutions formerly used, i. e., high molecular weight soaps or solutions of soaps derived from neutralizing the entire acid component of the hydrocarbon synthesis oil, failed to result in satisfactory separation of chemicals from the oil. Thus, in extracting the neutral oil containing non-acid chemicals with such soap solutions, an extract was obtained which, on stripping followed by topping the resulting distillate to about 100° C., did not give a satisfactory separation of hydrocarbons from chemicals. In this procedure, the first distillate secured contained from about 25 to 30 weight per cent hydrocarbons together with essentially all of the non-acid chemicals and when such distillate was topped to about 100° C., there was obtained an overhead amounting to about 25 to 30 weight per cent of the feed which contained only about 60 weight per cent of the hydrocarbons in the feed. While some concentration of hydrocarbons in the light ends was effected, the hydrocarbon content of the fraction boiling above 100° C. (bottoms) was too high to permit recovery of chemicals in a form sufficiently free from hydrocarbons to satisfy average industrial specifications. Moreover, in the distillation of non-acid chemicals from total soap mixtures, foaming frequently becomes so excessive that further separation of the chemicals from the extract is impossible.

Another method for removing chemicals from hydrocarbon synthesis oil has been developed and is described and claimed in co-pending application S. N. 140,249, filed January 24, 1950, by F. G. Pearce. In accordance with the principal embodiment of that process, neutralized synthesis oil is extracted with a soap fraction made up preferably of $C_2$ to $C_6$ acids. The extract thus obtained is then distilled to strip the chemicals and a minimum quantity of hydrocarbons from the soap solution and the bulk of the soap. Thereafter, the distillate which contains the chemicals is fractionated to temperatures of about 100° C., whereby separation between the chemicals and the major portion of the hydrocarbons is effected. In accomplishing the separation, however, 1-propanol, together with ketones, such as for example methyl ethyl ketone and methyl propyl ketone, are taken overhead with hydrocarbons, thereby appreciably lowering the quantity of chemicals recoverable in a substantially hydrocarbon-free condition. Also, as the strength of the soap solution employed as an extractant approaches 50 weight per cent, the quantity of hydrocarbons remaining in the residue after fractionation up to about 100° C. is found to increase.

Still another method which has been used for the recovery of chemicals from hydrocarbon-containing mixtures involves azeotropic distillation with methanol. However, on distillation of such mixtures the hydrocarbons pass into the overhead with the methanol in the form of a binary azeotrope, but the water present in the mixture remains behind with the chemicals and must be removed therefrom by other methods.

Accordingly, it is an object of my invention to recover these chemicals from crude hydrocarbon mixtures thereof by first extracting such mixtures with a suitable soap solution, as hereinafter discussed, stripping the resulting extract to obtain an overhead of chemicals together with a minor amount of hydrocarbons, subjecting said overhead to hydrogenation to convert all of the carbonyl fraction to the corresponding primary and secondary alcohols, and thereafter adding to this reduced mixture a substance capable of forming a ternary azeotrope with water and hydrocarbons, but which will not form azeotropes with the alcohols present. It is a further object of my invention to provide a process whereby higher ratios of soap to oil, or higher concentrations of soap extractant may be employed, if desired, without causing the recovered alcohols to contain objectionable concentrations of contaminating hydrocarbons. It is a still further object of my invention to provide a method for recovering solubilized non-acid chemicals present in the soap mixtures produced during neutralization of the raw hydrocarbon synthesis oil by subjecting such soap mixtures to a stripping operation, and thereafter effecting a reduction of the resulting enriched chemical fraction to convert the carbonyl portion thereof to the corresponding alcohols, after which the aqueous mixture thus obtained is subjected to distillation in the presence of a substance capable of forming a ternary azeotrope with water and the hydrocarbon contaminant to yield a residue of oil soluble alcohols substantially free from hydrocarbons.

I have discovered that ethyl and isopropyl alcohols, particularly the latter, may be advantageously employed to remove hydrocarbons from aqueous mixtures of oil soluble alcohols by azeotropically distilling such mixtures in the presence of ethyl or isopropyl alcohol. By this operation a ternary azeotrope of water, alcohol (ethanol or isopropyl alcohol) and hydrocarbons is removed, leaving a substantially pure residue of oil soluble alcohols. This observation is in direct contrast to prior procedures employing methanol which is capable of removing only hydrocarbons from mixtures of the aforesaid type. Although ethanol is capable of removing both water and hydrocarbons from mixtures of the type contemplated by my invention, I generally prefer to use isopropyl alcohol, because its hydrocarbon azeotropes usually contain a relatively high percentage of water, i. e. 5 to 15 weight per cent, thus constituting a comparatively efficient drying agent.

In accordance with my invention the oil soluble non-acid chemicals present in a neutral hydrocarbon synthesis oil stream are recovered therefrom by first subjecting the oil to extraction with a soap solution preferably consisting of aliphatic carboxylic acid salts derived from mixed acids having from 2 to 6 carbon atoms. The extract thus obtained is stripped to effect a separation of the soap from extracted chemicals together with from about 10 to 25 weight per cent of hydrocarbons depending on the strength of the soap solution and on the ratio of the extractant solution to oil employed. This distillate is then subjected to reduction, preferably by means of molecular hydrogen in the presence of a suitable catalyst such as, for example, Raney nickel at pressures of from about 300 to 1,000 pounds per square inch and at temperatures of around 200 to 250° C. The quantity of catalyst may vary, but generally concentrations of from about 2 to about 6 weight per cent, based on the carbonyl content of the distillate, are preferably employed. The usual types of hydrogenation apparatus may be utilized to effect this step such as, for example, pressure autoclaves fitted with suitable agitating devices or reaction vessels of the "rocking bomb" type which are well-known to the art.

By this hydrogenation step substantially complete conversion of the ketone and aldehydes is accomplished and to the resulting reduced mixture which contains 5 to 10 weight per cent water of solubility is added isopropyl alcohol in a concentration sufficient to remove the hydrocarbons and all of the water present in the reduced mixture. Ordinarily, the quantity of isopropyl alcohol used for this purpose corresponds to from about ¼ to about ½ the volume of the reduced mixture. The aqueous mixture of hydrocarbon-contaminated alcohols is then subjected to distillation, and fractionation thereof is continued until the vapor in the still reaches a temperature of about 91° C. This insures substantially complete removal of isopropyl alcohol from the residue without bringing over appreciable quantities of relatively low boiling oil soluble alcohol fraction, while the bottoms portion is substantially anhydrous and contains the oil soluble alcohols, together with from 0 to about 10 weight per cent hydrocarbons. Hydrocarbons, if present, occur in the alcohol residue because either a concentrated soap solution was employed in the initial extraction process or a ratio of soap to oil in excess of about 1:1 was used, or for both of these reasons. When hydrocarbons are found in the alcohol residue at this stage of the process, the mixture is further refined by extracting it, preferably with equal volumes of a low boiling hydrocarbon such as, for example, propane, butane, or pentane, whereby the remaining hydrocarbons present in the alcohol mixture are removed with relatively no solution of alcohols in the extractant. This operation is preferably effected in the presence of a soap solution, which serves to render the alcohols less soluble in the hydrocarbon employed in the extraction step. In the majority of instances these soap solutions are most advantageously employed in soap to alcohol ratios of 1:1 to 10:1.

The aqueous layer resulting from the neutralization of the raw hydrocarbon synthesis oil may also be processed subsequent to reduction in accordance with my invention. This layer frequently contains up to about 10 to 15 weight per cent of non-acid chemicals, together with as much as 5 to 8 weight per cent of hydrocarbons. Hydrogenated solutions of this type which have been topped to about 100° C. ordinarily contain upwards of 20 weight per cent hydrocarbons in the bottoms fraction and generally require the combined treatment discussed above, i. e., first, distillation in the presence of isopropyl alcohol up to a vapor temperature of about 91° C., and, thereafter, extraction of the residue from the aforesaid distillation step with a light hydrocarbon to remove the remaining hydrocarbon contaminants from the mixture of oil soluble alcohols.

The ratio of light hydrocarbon to the soap-alcohol mixture generally may vary from the 0.5 to about 2. Ordinarily, the concentration of soap solution used to extract the neutral synthesis oil may likewise vary. However, in general I have found that soap concentrations ranging from about 20 to about 50 weight per cent and preferably 30 to 40 weight per cent are usually most desirable. The composition of the selected soap fraction employed likewise may vary, and for the majority of instances solvents prepared from soap mixtures derived from mixed acids having an average molecular weight of from about 85 to 115, preferably from about 95 to 105, are generally suitable. The desired fraction of $C_2$ to $C_6$ soaps may be obtained in any conventional manner. For example, the corresponding acid fraction may be secured by first acidifying a soap solution formed by completely neutralizing raw primary synthesis oil to liberate the fatty acids, washing therefrom free mineral acid and salt formed during the acidification step, and thereafter distilling the resulting mixture of washed acids up to a temperature of about 210° C. (760 mm). The distillate thus obtained may then be neutralized by the addition of a substantially stoichiometric quantity of a suitable base to yield the desired $C_2$ to $C_6$ soap fraction which may then be diluted with water to the required concentration. As examples of bases suitable for use in the formation of these soaps, there may be mentioned ammonium hydroxide, ammonium carbonate, and the various hydroxides and carbonates of the alkali metals, all of which for the purpose of this description are referred to as "alkali metal hydroxides or carbonates."

I have further found that for a given soap solution, i. e., total soap or a solution of selected soaps, preferably a solution of $C_2$ to $C_6$ soaps, the quantity of hydrocarbons removed from the neutral oil along with the chemicals varies directly with the strength of the soap solution used and also with the ratio of soap to oil employed. Thus, solutions of 20 weight per cent soap extract less hydrocarbon with the chemicals than do 50 weight per cent soap solutions, but the latter also extract more chemicals than can be obtained with an equivalent volume of 20 weight per cent soap. Generally, concentrations of soap up to about 50 weight per cent may be employed to extract the neutral oil in ratios of about 1:1 without extracting more hydrocarbons along with chemicals than can be removed by azeotropic distillation with isopropyl alcohol. However, ratios of 40 to 50 weight per cent soap of the order of 2 volumes of soap to 1 of oil generally result in removing more hydrocarbon contaminants than be removed by azeotropic distillation of the resulting mixture in the presence of isopropyl alcohol and should be further extracted with a suitable light hydrocarbon, as pointed out above.

The nature of the contaminating hydrocarbon present in the oil soluble alcohol mixture contemplated, as indicated above, varies with the relative amount and strength of the soap solution employed. Thus, with 1:1 ratios of 30 to 50 weight per cent soap to oil the hydrocarbon contaminant present in the mixture of oil soluble alcohols will generally be found to contain not more than about 8 carbon atoms per molecule, the heaviest hydrocarbon component thereof boiling at about 126° C. Hydrocarbon contaminants of this type can all be removed from the alcohol mixture by distillation in the presence of ethanol or isopropyl alcohol. However, with extracts obtained by the use of 2:1 or higher ratios of 40 to 50 weight per cent soap solutions to neutral oil, a greater percentage of the hydrocarbon contaminants will be found to boil above 126° C. and, hence, do not form azeotropes with ethanol or isopropyl alcohol. It is mixtures such as these that require treatment with a light hydrocarbon before complete removal of the heavy hydrocarbons can be achieved. In this connection, it is to be pointed out that I am obviously only concerned with those hydrocarbons boiling above 126° C. and which either form azeotropes with certain of the alcohols or boil sufficiently close thereto that it is difficult to effect a satisfactory separation by fractional distillation. Accordingly, the expression "hydrocarbons boiling above 126° C." appearing in the present description and claims is intended to have the aforesaid meaning and no other.

The distillate of chemicals from the soap extract prior to reduction varies in its composition. The majority of such mixtures obtained from hydrocarbon synthesis oil streams, however, usually contain from about 10 to 30 weight per cent of carbonyl compounds and from about 70 to about 75 weight per cent alcohols. After stripping these chemicals from the soap extract and reducing the carbonyl component to the corresponding alcohols, the total alcohol content generally ranges from about 80 to 90 weight per cent. The alcohols present in this reduced fraction have an average molecular weight of about 100. In the synthesis oil fractions investigated the following alcohols have been identified: n-propanol, sec. butanol, n-butanol, iso- and n-amyl alcohols, iso- and n-hexyl alcohols, iso- and n-heptyl alcohols, and iso- and n-octyl alcohols, with the $C_4$ and $C_5$ alcohols accounting for about 35 to 40 per cent of the total alcohols present.

The expresison "total soap," appearing in the present description, is intended to refer to the mixture of soaps prepared by neutralizing the fatty acids presents in the raw primary synthesis oil or the equivalent thereof. The term "soap" as used herein is intended to include both the surface active and non-surface active salts derived from fatty acids of the type present in raw primary synthesis oil. The expresison "oil soluble alcohols" used throughout the present description and claims is intended to refer to the $C_4$ and higher alcohols.

An embodiment of the present invention is illustrated by the specific example which follows:

*Example*

A quantity of neutral hydrocarbon synthesis oil was extracted with an equal volume of 40 weight per cent $C_2$ to $C_6$ soap. The resulting soap extract was stripped at 100° C. and the distillate thus obtained subjected to hydrogenation in the presence of 5 weight per cent of Raney nickel catalyst at 200° C. and at pressures of from about 300 to about 500 pounds per square inch. Prior to hydrogenation the distillate contained 25.1 weight per cent carbonyl compounds and 54.6 weight per cent alcohols. Reduction was effected in a rocking bomb type hydrogenation apparatus fitted with a pyrex glass liner. Hydrogenation was continued until a constant pressure was reached within the reactor. Thereafter, the reduced mixture was separated from the catalyst by filtration and 456 parts of the filtrate was combined with 185 parts of isopopyl alcohol and charged to a still. The 456 parts of reduced distillate contained 13.5 weight per cent hydrocarbon, 6.1 weight per cent water and 79.7 weight per cent alcohol. Distillation was continued until a temperature of 90.3° C. was reached in order to allow all the isopropyl alcohol to pass over into the distillate. The anhydrous residue in the still contained 97.4 weight per cent alcohol and about 0.7 weight per cent hydrocarbons. The remainder of the residue consisted of oil soluble esters, principally, butyl and amyl acetates.

My invention may be further illustrated by reference to the accompanying flow diagram in which a mixture containing 12 weight per cent hydrocarbon, 7 weight per cent water and 81 weight per cent oil soluble alcohols is introduced into column 2 through line 4 together with isopropyl alcohol which is led into line 4 through line 6. Isopropyl alcohol is introduced into the mixture in an amount and at a rate such that all the water is taken overhead through line 8 and condenser 9, together with hydrocarbon impurities, a portion of this distillate being returned as reflux to the column through line 11. A dry mixture of oil soluble alcohols containing less than 2 weight per cent of hydrocarbons is withdrawn from column 2 through line 10 and the various alcohols separated from one another by means of fractional distillation. The overhead from column 2 is introduced into washing column 12 through line 8 where it meets a countercurrent stream of water introduced through line 14. By this step the isopropyl alcohol is washed away from the hydrocarbons and the latter withdrawn from the column through line 16. The dilute isopropyl alcohol is withdrawn through line 18 and introduced into column 20 where a water binary azeotrope is taken off overhead through line 22 and condenser 23, a reflux being returned to the column through line 25. The bottoms water from this operation is withdrawn through line 24 and combined with the water in line 14 which is subsequently used in washing more isopropyl alcohol away from hydrocarbon contaminants in column 12. The constant boiling mixture of water and isopropyl alcohol is next introduced into extractor 26 through line 22 where it is directly mixed with benzene added through make-up line 28. The saturated benzene containing the major proportion of the isopropyl alcohol is removed from extractor 26 through line 30 and introduced into drying column 32. Water from extractor 26 is withdrawn through line 34 and fed to benzene-stripping column 36. The overhead from column 36 is recycled to extractor 26 through line 39 and the bottoms withdrawn through line 37 and used as washing water in column 12. As water builds up in the system it may be periodically purged therefrom by withdrawal from stripping column 36 through line 15. A ternary of benzene, isopropyl alcohol and water is taken overhead from column 32 through line 38 and condenser 40, and introduced into separator 42. The upper benzene layer is recycled to extractor 26 through line 44. The lower water layer is withdrawn through line 46 and combined with water in line 34 and the benzene present therein removed in stripping column 36. Dry isopropyl alcohol is withdrawn from column 32 through line 48 and recycled to make-up line 6.

In instances where feed stocks are employed which contain more hydrocarbon contaminants than can readily be removed in accordance with the system just described, the residue from the azeotropic distillation operation in column 2 may be extracted with a light hydrocarbon such as, for example, butane to complete the removal of the aforesaid hydrocarbon contaminants. Typically, feed stocks having in the neighborhood of about 25 weight per cent of hydrocarbons as an impurity, after azeotropic distillation with isopropanol, contain 9 to 12 weight per cent of higher hydrocarbons which do not azeotrope with that alcohol. That portion of the flow diagram enclosed by broken lines denotes the system employed for handling streams containing the higher boiling hydrocarbons. Such mixtures are withdrawn through lines 10 and 49 and introduced into butane extraction column 50 operated at from about 15 to 40° C. and under a pressure of approximately 65 to 100 pounds per square inch. To decrease the solubility of the oil soluble alcohols in butane, a stream of lean soap derived from $C_2$ to $C_6$ aliphatic acids and in the form of a 40 to 50 weight solution is introduced into column 50 through line 52 in an amount preferably such that a mixture of about 10 weight per cent alcohols in soap is maintained. Butane is led into column 50 through line 54 where it is contacted with the resulting mixture of soap, hydrocarbons and alcohols. The butane preferentially extracts the heavy hydrocarbons from the alcohol, and the resulting rich butane fraction is withdrawn through line 56 and introduced into butane recovery column 58. This column is operated preferably at a temperature of about 55° C. and at an elevated pressure such as, for example, 70 pounds per square inch. Heavy hydrocarbons are withdrawn through line 60 for further refining. Butane is taken overhead and introduced into butane make-up line 54 via line 62 and condenser 64. A portion of the overhead is refluxed to the column through line 66. The bottoms from column 50 which consists of a solution of oil soluble alcohols and soap together with some dissolved butane is withdrawn through line 68 and introduced into column 70 operated at a temperature of about 55° C. and at a pressure of 70 pounds per square inch, where the butane is stripped off overhead through line 72 and condenser 74 and again introduced into column 50 via lines 62 and 54. A portion of the overhead from column 70 is returned as reflux through line 76. The bottoms fraction in column 70 which consists essentially of soap and alcohols is withdrawn through line 78 and introduced into column 80. In this column a mixture of hydrocarbon-free alcohols is taken overhead through line 82 and condenser 84 with a portion of the distillate being returned to the column as reflux through line 86. If further removal of water from the alcohols thus obtained is desired, this may be accomplished by subjecting the mixture of alcohols to distillation in the presence of isopropyl alcohol or some other suitable azeotroping agent which will not contaminate the mixture of alcohols. The bottoms consists of lean soap which is withdrawn through line 88 and recycled to soap make-up line 52.

From the foregoing description it will be apparent that the process of the present invention is capable of effectively handling hydrocarbon-containing oil soluble alcohol mixtures of widely varying composition. It will also be obvious that numerous modifications in manipulative steps may be made in my process without departing from the scope thereof. For example, other means of drying ethanol or isopropyl alcohol may be utilized in addition to that described in the foregoing specific example. Likewise, oil soluble alcohols may be recovered in accordance with my invention from hydrocarbon contaminated feed mixtures other than those specifically mentioned herein.

I claim:

1. In a process for removing water and normally liquid hydrocarbons boiling up to about 126° C. from an aqueous mixture of oil-soluble alcohols, including 2-butanol, at least some of which form close boiling azeotropes with said hydrocarbons, said aqueous mixture having been derived by the reaction of hydrogen with carbon monoxide in the presence of a hydrocarbon synthesis catalyst, the steps which comprise adding to a mixture containing water, said hydrocarbons, and alcohols a sufficient quantity of isopropyl alcohol to form a minimum boiling azeotropic mixture with said hydrocarbons and with the water present in the mixture, and subjecting the latter to distillation to obtain overhead an azeotropic mixture comprising water, hydrocarbons and said isopropyl alcohol.

2. In a process for obtaining a substantially anhydrous mixture of oil soluble alcohols, including 2-butanol, from an aqueous mixture comprising said alcohols contaminated with hydrocarbons containing up to about 8 carbon atoms per molecule, said aqueous mixture having been derived by the reaction of hydrogen with carbon monoxide in the presence of a hydrocarbon synthesis catalyst the steps which comprise adding to said mixture a sufficient quantity of isopropyl alcohol to form a minimum boiling azeotropic mixture with said hydrocarbon contaminants and with the water present in said mixture, subjecting the latter to distillation to obtain overhead azeotropic mixtures of said isopropyl alcohol, water and hydrocarbon and continuing distillation until the residue of oil soluble alcohols is substantially free from water and contaminating hydrocarbons.

3. In a process for removing water and normally liquid hydrocarbons boiling up to about 126° C. from an aqueous mixture of oil-soluble alcohols, including 2-butanol, and contaminating hydrocarbons, wherein said mixture is derived by first extracting hydrocarbon synthesis oil-containing oxygenated organic chemicals including alcohols and carbonyl compounds with an aqueous soap solution, subjecting the resulting extract to distillation whereby the extracted chemicals and some water together with contaminating quantities of hydrocarbons are taken overhead, leaving as a residue a relatively concentrated aqueous solution of said soap, subjecting the above-mentioned overhead fraction to catalytic reduction with hydrogen whereby said carbonyls are substantially completely converted into their corresponding alcohols, the improvement which comprises adding to the mixture resulting from said reduction with hydrogen a sufficient quantity of isopropyl alcohol to form a minimum boiling azeotropic mixture with said hydrocarbon and with the water present in the mixture, subjecting the latter to distillation to obtain overhead an azeotropic mixture comprising water, hydrocarbons and said isopropyl alcohol, and continuing distillation until the residue of oil-soluble alcohols is substantially free from water and contaminating hydrocarbons.

4. In a process for obtaining a substantially anhydrous mixture of oil-soluble alcohols from an aqueous mixture comprising said alcohols, including 2-butanol, contaminated with hydrocarbons containing up to about 8 carbon atoms per molecule, said aqueous mixture having been derived by the reaction of hydrogen with carbon monoxide in the presence of a hydrocarbon synthesis catalyst the steps which comprise adding to said mixture a sufficient quantity of isopropyl alcohol to form a minimum boiling azeotropic mixture with said hydrocarbon contaminants and with the water present in said mixture, subjecting the latter to a distillation step to obtain overhead an azeotropic mixture of said isopropyl alcohol, water and hydrocarbons continuing distillation until the residue of oil-soluble alcohols is substantially free from water and contaminating hydrocarbons, washing the aforesaid azeotropic mixture with water, distilling the resulting water washings to obtain overhead a water-isopropyl alcohol azeotrope, drying said azeotrope and returning the resulting dry isopropyl alcohol to the aforesaid distillation step.

References Cited in the file of this patent

UNITED STATES PATENTS

| Number | Name | Date |
|---|---|---|
| 1,688,731 | Merley | Oct. 23, 1928 |
| 2,099,475 | Gresin et al. | Nov. 16, 1937 |
| 2,524,899 | Dunn | Oct. 10, 1950 |
| 2,540,143 | Solomon | Feb. 6, 1951 |
| 2,568,717 | Burton et al. | Sept. 25, 1951 |
| 2,583,620 | Wrightson | Jan. 29, 1952 |

FOREIGN PATENTS

| Number | Country | Date |
|---|---|---|
| 576,302 | Great Britain | Mar. 28, 1946 |
| 118,517 | Australia | Oct. 16, 1947 |

OTHER REFERENCES

Horsley: Table of Azeotropic Data, reprint from Analytical Chemistry, vol. 19, August 1947, pages 586 and 587.